Patented Mar. 27, 1923.

1,450,026

UNITED STATES PATENT OFFICE.

EGON EICHWALD AND HANS EDGAR RICHARD VOGEL, OF HAMBURG, GERMANY.

PROCESS FOR THE MANUFACTURE OF LUBRICANTS FROM LOW TEMPERATURE TAR.

No Drawing. Application filed July 10, 1922. Serial No. 574,112.

*To all whom it may concern:*

Be it known that we (1), EGON EICHWALD (2) and HANS EDGAR RICHARD VOGEL, residing at Hamburg, Germany, have invented certain new and useful Improvements in a Process for the Manufacture of Lubricants from Low Temperature Tar, of which the following is a specification.

The invention relates to a process for the manufacture of lubricants from low temperature tar. An attempt has already been made to produce lubricating oils from low temperature tar, which has been freed from paraffin. As the simple preparation of the low temperature tar by the well known polymerization process did not give the results desired, it has been proposed to heat the distillate, which has been freed from paraffin under pressure, to a relatively high temperature and, after the heat has been allowed to act sufficiently, to remove the oils, which have a low boiling point, from the product of the reaction by distillation. According to this process the parts of the low temperature tar, which are distilled off within certain limits, are heated for several hours to fairly high temperature (300-350°) at pressures of about 10 atmospheres. The yield is comparatively small. The viscosity of the finished product is only moderate. The dark lubricating oil thus obtained can by no means be reckoned among lubricating oils of specially high quality.

According to the new process, for which a patent is sought, (1) The high pressure when heating for the purpose of the polymerization is superfluous;

(2) Heating to over 300 C. is not necessary in the polymerization process, as is the case in the well known process;

(3) A finished product of high quality lubricating oil can be produced directly, without its being necessary subsequently to separate by distillation, oils having a low boiling point.

Low temperature tar, which is rich in non-saturated compounds, is used for the primary material and more particularly those constituent parts which distil between 260–320°, preferably between 275 and 300°, at atmospheric pressure, after being previously freed from paraffin and from phenols. The lower the temperature during polymerization, the better the properties of the final product. The viscosity can be increased at will according to the degree to which the polymerization medium is allowed to act. The degree of viscosity actually corresponds to the lubricating property, which is by no means the case with the products which are heated under pressure at from 300 to 350° and are subsequently freed by distillation from the oils having a low boiling point. Viscosities up to 30° Engler at 50° C. were obtained. The final product was light coloured.

This process, which, compared with what was already known, has not only commercial, but more particularly considerable technical advantages, is illustrated below by two examples:—

*Examples.*

(1) A distillate of low temperature tar, which has been freed from phenols and paraffins and has a boiling point of 275 to 300° C. at the most, had air blown into it at about 120° C. for 24 hours. The viscosity rose gradually, when treating a distillate of low temperature tar prepared in such a manner, from 4.59° Engler at 20° C. to 4.66° Engler at 100° C.

(2) The same distillate was subjected, after the removal of the phenols and paraffins and while being constantly stirred at 80° C. and at a pressure slightly below atmospheric pressure in an atmosphere of hydrogen between the coatings of an electrical condenser for about 6 hours, to the action of high tension electric oscillations with only a small consumption of energy. The viscosity increased from 4.59° Engler at 20° C. gradually to 5° Engler at 100° C.

More particularly by the process described in the second example a good light coloured lubricating oil of the highest viscosity can be obtained.

The process described in the above examples can be carried out by any other polymerization process (without superatmospheric pressure), if the special working conditions are adhered to.

We claim:

1. A process of producing a lubricating oil of good quality from distillate of low temperature tar, which comprises the step of subjecting such distillate to alternating electric currents, while subjecting the same to a polymerizing operation.

2. A process of producing lubricating oil of good quality from a distillate of low temperature tar distilling between about 260 and about 320° C., such distillate containing considerable amounts of unsaturated hydrocarbons, the major part at least of the paraffin and phenols having been removed from such distillate, by subjecting such distillate to a polymerizing process, at substantially below the boiling point of the oil, and while subjecting the distillate to alternating electric currents.

In testimony whereof we affix our signatures in presence of two witnesses.

Dr. EGON EICHWALD.
Dr. HANS EDGAR RICHARD VOGEL.
Witnesses:
 E. RASPAREK,
 H. DEICKE.